Patented July 28, 1931

1,816,734

UNITED STATES PATENT OFFICE

LEONARD ANGELO LEVY, OF LONDON, ENGLAND, ASSIGNOR TO WIERES, LIMITED, OF LONDON, ENGLAND

ELECTRODE FOR ELECTRIC BATTERIES, ELECTROLYTIC CELLS, AND THE LIKE

No Drawing. Application filed August 26, 1929, Serial No. 388,625, and in Great Britain September 21, 1928.

This invention relates to electrodes for electric batteries, electrolytic cells and the like and has for its object to provide improved electrodes which are practically unattacked by the electrolyte or products with which they are associated.

The invention is particularly applicable in connection with electric cells of the kind wherein a halogen or halogens is or are evolved at one or other of the electrodes during operation, one of the difficulties having been hitherto to provide an anode which is substantially or is entirely unattacked by halogens evolved in the nascent state during the charging of secondary cells of this type.

In carrying the invention into effect in one form by way of example I provide an electric cell constructed on the lines set out in British application No. 12,385 of 1928, Patent No. 320,916, except that I replace the carbon rod within the anode by a rod of silicon iron alloy, the amount of silicon employed being about 14 to 15 per cent.

Not all silicon iron alloys of the above percentage content are effective in giving adequate anti-corrosive properties under conditions arising in such cells and reference should be made to the micrographic structure in order to select alloys yielding the desired results.

In suitable silicon iron alloys according to the present invention the micrographic appearance (at 500 diameters magnification) indicates a condition of silicon iron solid solution containing considerable proportions of graphite in the form of curved plates and small masses which are not well defined in photographs taken at lower magnifications.

Having now described my invention, what I claim as new and desire to secure by Letters Patent is:—

An electrode for galvanic cells composed of a silicon iron alloy containing about 14 to 15 per cent. of silicon and having a micrographic structure which at 500 degrees of magnification indicates a condition of silicon iron solid solution containing considerable proportions of graphite in the form of curved plates and small masses.

In testimony whereof I have signed my name to this specification.

LEONARD ANGELO LEVY.